J. R. SMITH.
SAW SHARPENING DEVICE.
APPLICATION FILED JAN. 11, 1913.

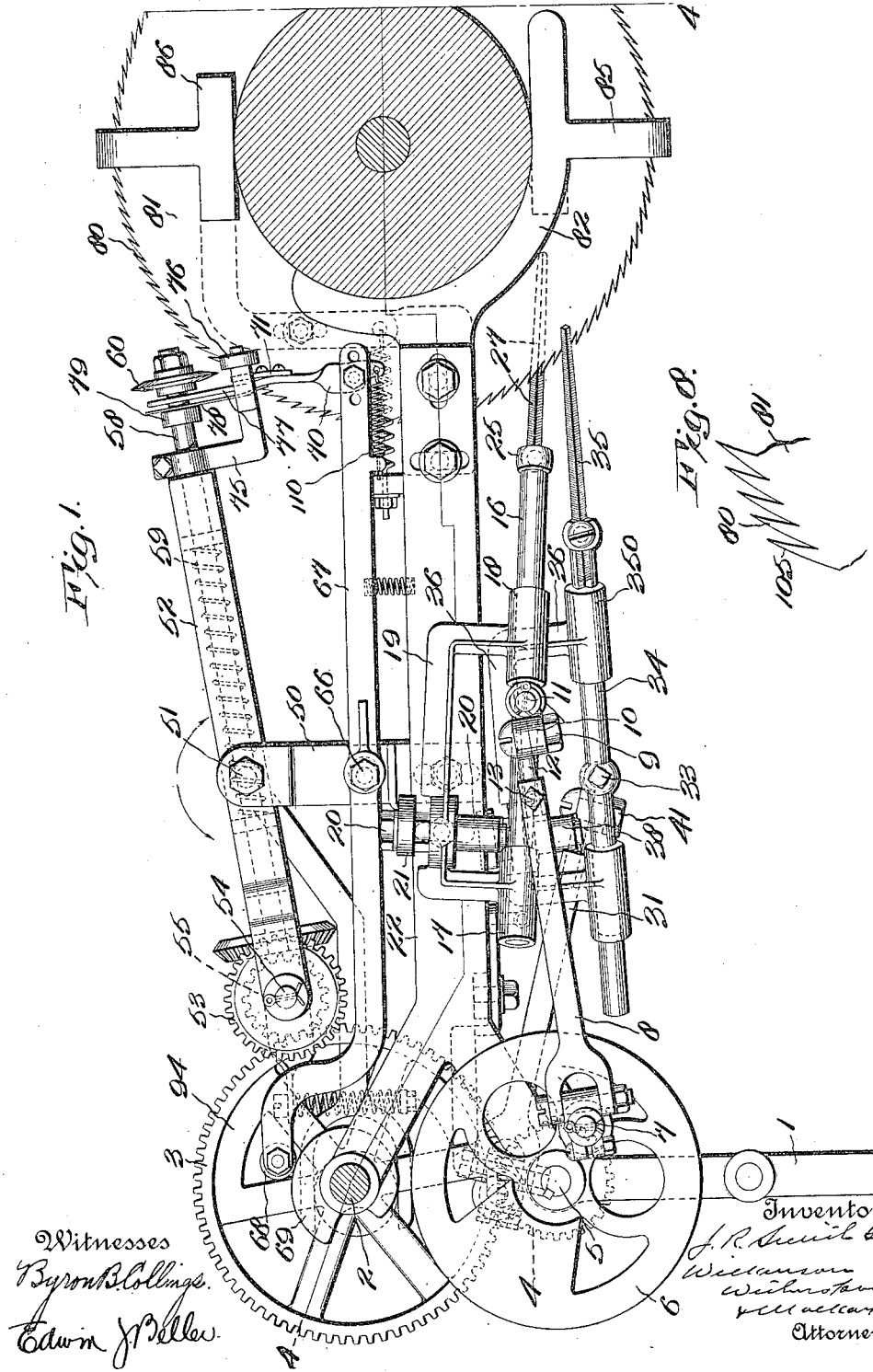

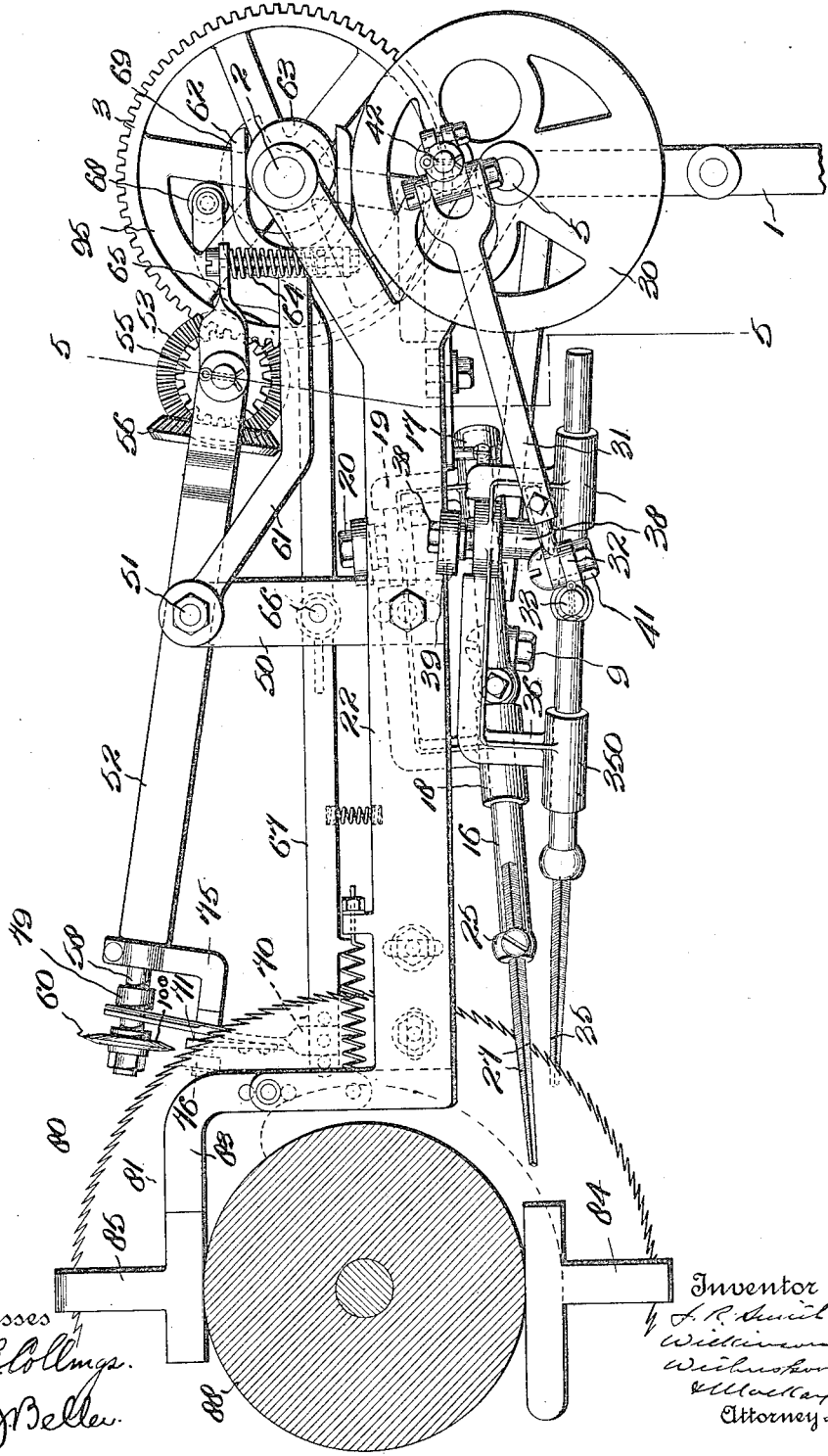

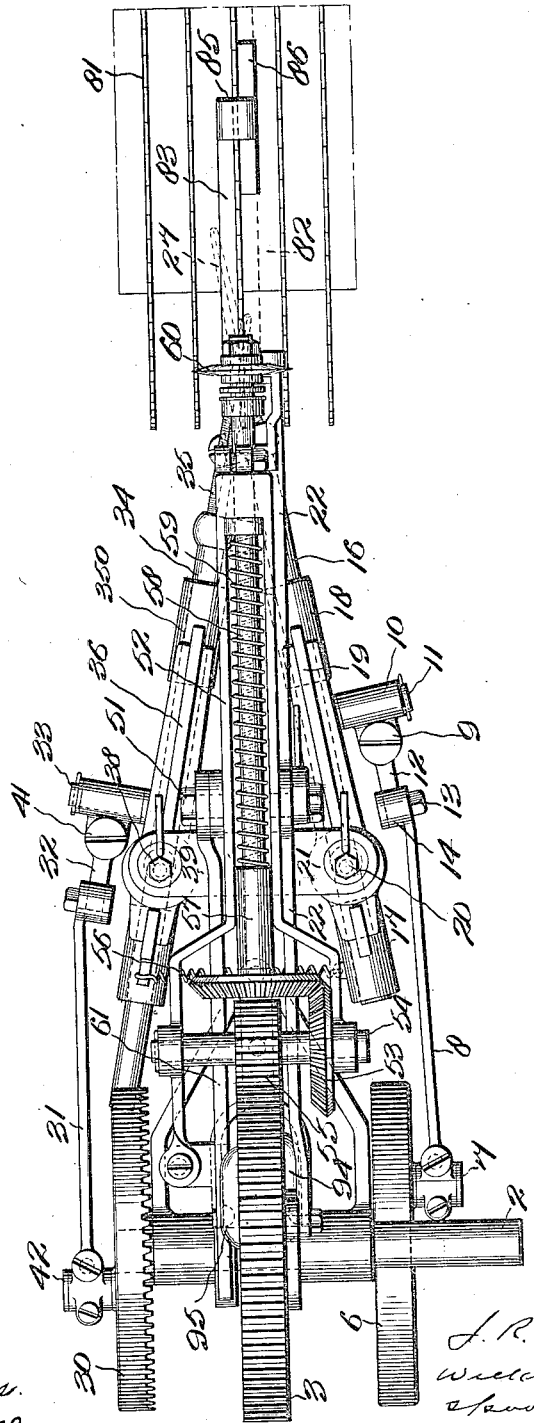

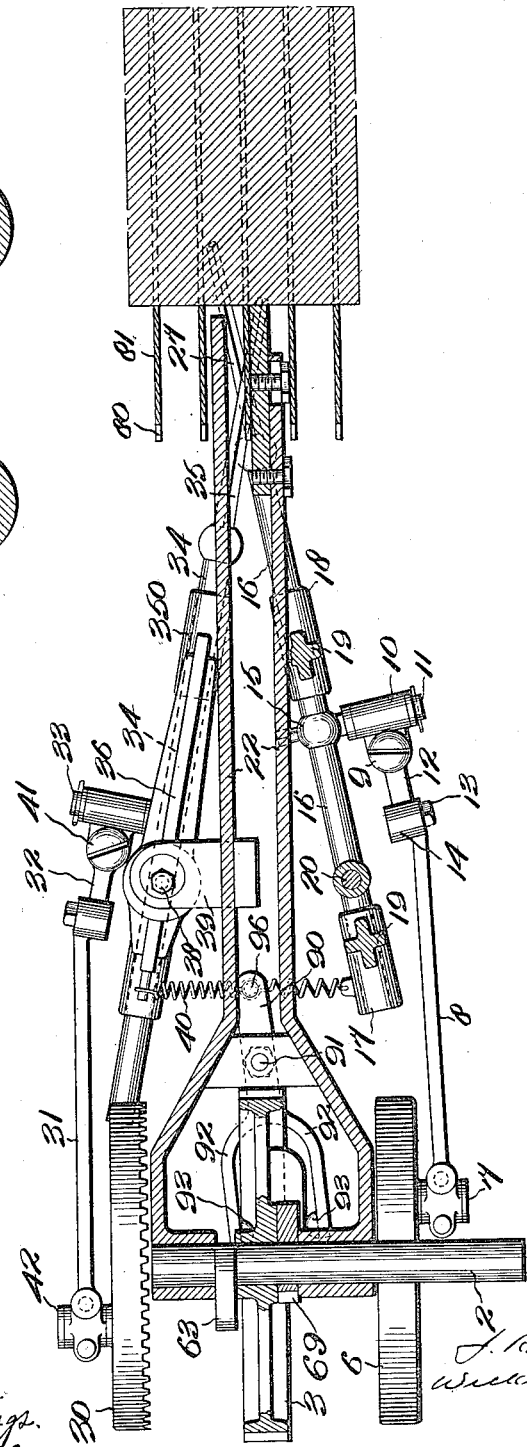

1,143,084.

Patented June 15, 1915.
5 SHEETS—SHEET 5.

Witnesses
Byron B. Collings
Edwin J. Beller

Inventor
J. R. Smith
by Wilkinson, Witherspoon & MacKaye
Attorneys

UNITED STATES PATENT OFFICE.

JOHN R. SMITH, OF McDONOUGH, GEORGIA, ASSIGNOR OF FORTY ONE-HUNDREDTHS TO HORATIO H. NEWMAN, OF SANDERSVILLE, GEORGIA.

SAW-SHARPENING DEVICE.

1,143,084.  Specification of Letters Patent.  Patented June 15, 1915.

Application filed January 11, 1913. Serial No. 741,554.

*To all whom it may concern:*

Be it known that I, JOHN R. SMITH, a citizen of the United States, residing at McDonough, in the county of Henry and State of Georgia, have invented certain new and useful Improvements in Saw-Sharpening Devices; and I do hereby declare the following to be a full, clear, and exact description of the invention, such as will enable others skilled in the art to which it appertains to make and use the same.

This invention relates to a saw filing and gumming machine, and has for its object to produce a mechanism especially adapted for operating on gin saws which will be more efficient in action, simple in construction, and less expensive to construct than those heretofore proposed for the same purpose.

With these and other objects in view, the invention consists in the novel details of construction and combinations of parts more fully hereinafter disclosed and particularly pointed out in the claims.

Figure 5:
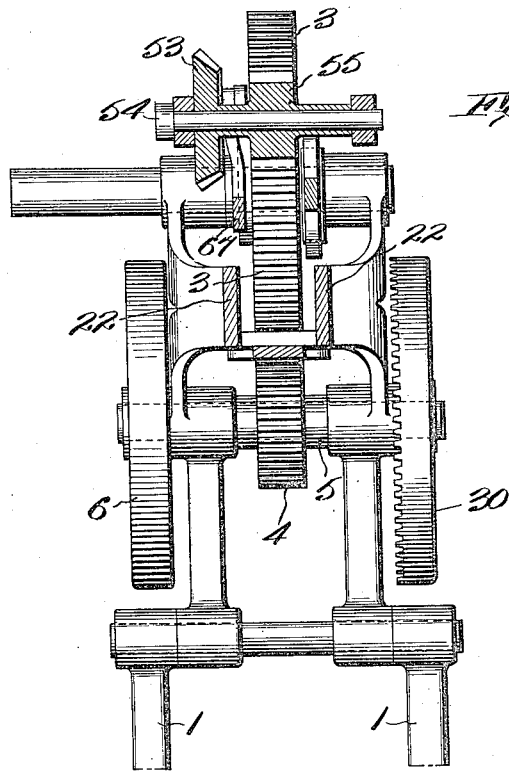
Figure 6:
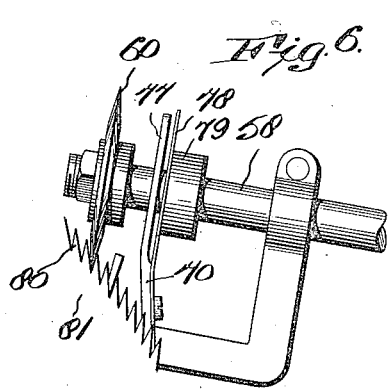
Figure 4:
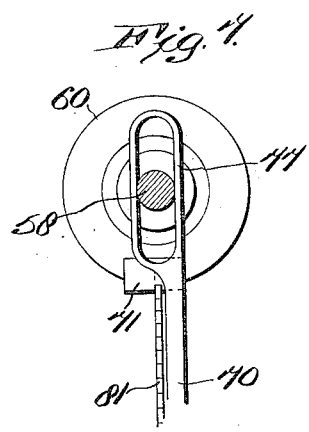

Referring to the accompanying drawings forming a part of this specification in which like numerals designate like parts in all the views: Figure 1 is a side elevational view of a machine built in accordance with my invention showing the same in position to operate on a plurality of gin saws; Fig. 2 is a view similar to Fig. 1, but looking in an opposite direction; Fig. 3 is a plan view of the machine ready for operating upon the gin saws; Fig. 4 is a sectional view of the machine and gin saws taken on the line 4—4 of Fig. 1; Fig. 5 is a sectional view of the machine taken on the line 5—5 of Fig. 2; Fig. 6 is an enlarged elevational view of the circular file and pawl for operating on and between the gin saw teeth; Fig. 7 is an end elevational view partly in section of the parts shown in Fig. 6; Fig. 8 is an enlarged detail view illustrating the shape of the teeth of gin saws after having been operated upon by my machine; and, Figs. 9 and 10 are detail sectional views showing means for holding triangular or square files, as may be desired.

Referring to the drawings: 1 indicates any suitable support preferably provided with a pivotal connection to the frame as shown in Figs. 1, 2 and 5, and 2 is a power shaft which may be operated by any suitable means. Mounted on said shaft 2 is the driving gear 3, meshing with the pinion 4 mounted on the shaft 5, carrying the wheel 6, which is provided with the pin or connection 7 to which is connected the pitman 8 pivoted as at 9 to the sleeve 10 mounted on the stud or pin 11. The pitman 8 may be in two parts, one of which parts 12, being adjustable upon the other part by means of the set screw 13 passing through a boss 14, all as will be clear from Figs. 1, 3 and 4.

As best shown in Fig. 4, the pin or stud 11 is provided with an enlargement 15, through which passes the reciprocating rod 16 associated with bearings 17 and 18 carried by the bracket 19, pivotally supported on the vertical pin 20 which in turn is supported by a bracket 21, mounted on the main frame 22 of the machine (see Fig. 1). One end of the reciprocating rod 16 is provided with a clamping member 25 and a set screw 26 (Figs. 9 and 10), for the purpose of holding a triangular file 27 or a rectangular file 28, as may be desired.

It is evident from the mechanism so far disclosed, that upon applying power to the shaft 2, the gear 3 will be rotated, which will turn the pinion 4 on shaft 5 and the wheel 6. The rotation of the wheel 6 will reciprocate the pitman 8 and the pin 11, which in turn will reciprocate the rod 16 in the bearings 17 and 18, as well as the file 27. Also carried by the shaft 5 is a wheel 30, equipped with a pitman 31 and other connections numbered 42, 32, 41, 33, 34 and 350, which are precisely alike, or duplicates of, the corresponding members 7, 12, 9, 11, 16 and 18 just described. In other words, the rod 34 reciprocates a companion file 35 which crosses the file 27, as clearly illustrated in Figs. 1, 3 and 4, and which acts upon the teeth 80 of the gin saws 81 as will appear below. It will, therefore, likewise be clear that the turning of the shaft 5 will reciprocate both the files 27 and 35 to operate upon the said teeth.

The bearings, such as 350, for the file carrying rod 34, are likewise supported by a bracket 36, which is a duplicate of the bracket 19, and which bracket is also pivotally supported by a short vertical stud 38, which in turn finds its support in a bracket 39 mounted upon the main frame 22. The bracket 39 is likewise a duplicate or a part of the bracket 21 which supports the short stud 20. A spring 40 connects the brackets 19 and 36, as shown, and therefore, constantly tends to pull apart the files 27 and 35, or, in other words, to press said files against the sides of the saw teeth 80. Further, as clearly shown in Fig. 4, if we draw a line through the members 7 and 9, and through the corresponding members 42 and 41, the said lines, when prolonged, will be found to be inclined to each other, and the same will be true if we draw lines through the axes of the pins 11 and 33, which are respectively at right angles to the file rods 16 and 34.

It follows from this construction that as the pitman 8 forces the rod 16 to the right, as seen in Fig. 4, it will tend to turn said rod 16 on its pivot 20 in a direction opposite to that of the hands of a clock, as seen in said figure, and when the said pitman 8 moves to the left, as seen in said figure, it also moves the said rod 16 on its pivot 20 in a direction with the hands of a clock. This same oscillating motion is likewise imparted to the rod 34 through the action of the pitman 31. It consequently follows that as the pitmen 8 and 31 reciprocate, the files 27 and 35 are alternately pressed against the sides of the saw teeth, since the said files oscillate on the pins 20 and 38 as centers. During this oscillation, the spring 40 is placed under a greater or less tension, and thereby holds the files yieldingly to their work. Also rising from the main frame 22 of the machine is a central support or bracket 50 to which, as at 51, is pivoted a longitudinal bar or member 52, carrying a beveled gear 53 mounted on the cross pin 54 on which is also mounted the pinion 55, gearing with the main gear 3, as clearly illustrated in Figs. 1 and 3.

Meshing with the beveled gear 53 is the beveled gear 56 mounted on the longitudinally disposed sleeve 57 in which telescopes the rod 58 surrounded by the spring 59. The outer end of the rod 58 carries a circular file 60. Also mounted on the pivot 51 is a forked cam lever 61, the forks 62 of which straddle a cam 63 on the shaft 2, as best illustrated in Figs. 2 and 3.

It will now be clear from what has just been said that as the shaft 2 and cam 63 revolve, the lever 61 will be oscillated on its pivot 51, and as said lever is connected by a spring 64 to an extension 65 of the frame 52, the said frame together with the rod 58, the file 60, and the pinion 55, as well as the beveled gears 53 and 56, will all be oscillated on the pivot 51 as a center. And, further, the turning of the gear 3 will, through the pinion 55, the bevel gears 53 and 56, and the rod 58, rotate the file 60. In other words, the rotation of the cam 63 will move the file 60 up and down into and out of contact with the gin saw teeth, while the gear 3 is rotating said file, all as will be clear from Figs. 1 and 2. Also pivoted to the upright 50 as at 66, is the cam lever 67 provided at one end with the roller 68 coacting with the cam 69 also mounted upon the shaft 2. The other end of said lever 67 carries the pawl member 70 provided with the pawl tooth 71 adapted to engage the teeth 80 of the gin saws, as will be more fully described hereinafter. But, it will be clear from what has now been said, that as the shaft 2 revolves, it also causes the lever 67 to reciprocate the pawl tooth 71 up and down into and out of engagement with the teeth of the gin saws, and thereby rotate said saws one tooth at a time.

Attached to the member 52 is the angularly shaped piece 75 through which the rod 58 also reciprocates, and attached to the outer end of said angular piece is the roller 76 adapted to take against the side of a saw 81 as it rotates under the influence of the pawl 71 in order to steady the saw.

The pawl member 70 is provided with a slotted extension 77 best shown in Fig. 7, which straddles the shaft 58, and associated with said extension 77 is a slotted spring 78 which reciprocates up and down with said member 70. Associated with the spring 78 and member 77 is the collar 79 on the shaft 58. It results from this construction that as the pawl member is reciprocated by the cam lever 67, the spring 78 takes against the collar 79, which, when the pawl is lifted, forces said pawl 71 forward so as to engage another tooth on the saw blade.

During the oscillation of the member 52 and the disk file 60, the pinion 55 rides up and down on the surface of the gear 3, owing to the fact that both ends of the member 52 oscillate, but the gear teeth are of such dimensions that they are not disengaged. When, however, the end of the rod 58 which carries the file 60, moves downward, the side 100 of file 60 lies against a collar on the shaft 58 and this said collar contacts with the member 77 carrying the pawl tooth 71, which steadies said file during its gumming operation, and, as said pawl continues to rotate the saw, the file 60 acts upon the moving edge of the tooth to maintain its circular contour. When the said file is raised, the spring 59 forces the file forward to engage another tooth and the spring 78 cushions this action, as above stated. In the meantime, the adjustable spring 110 (Fig. 1) moves the pawl forward to engage another tooth.

The parts are so timed as will be clear from the angular position of the cams 63 and 69 in Fig. 2, that considering the pawl 71 at its lowest position, and the roller 68 about to enter the depression in the cam 69, the file 60 will be brought almost to its lowest position by its eccentric 63. But, the said file 60 is brought to its position through the compression of the spring 64, and therefore the said file is capable of descending still farther when the said spring 64 is later released from its compression through the further rotation of the eccentric 63. But, assuming the pawl 71 to be in its lowest position and the roller 68 about to enter the said depression in the cam 69, as above stated, a further turning of the gear 3 and the said cam 69 in a counter-clockwise direction, as shown in Fig. 2, will cause the pawl 71 to suddenly rise, while the file 60 continues to lower under the action of the compressed spring 64. As the said cam 69 continues to rotate in a counterclockwise direction, the roller 68 will ride out of the depression in said cam, and consequently the pawl 71 will begin to descend. The said pawl, however, in the meantime, has been tipped forward to engage another tooth through the action of its controlling spring 110, as illustrated in Fig. 1, and therefore as it now begins to descend, it enters the throat of the succeeding tooth, and after reaching the bottom thereof, it turns the saw in a clockwise direction as shown in Fig. 2. In the meantime, the compressed spring 64 continues to lower the file 60 and to cause the same to press firmly in the throat in its cutting out, and the spring 64 will remain under compression and keep up this pressure until the depression in the cam 69 has turned about 30° beyond the roller 68, and the maximum lift of the eccentric 63 has passed the eccentric yoke 62. After the compression of the spring has been thus exhausted, the continued turn of the eccentric 63 will further lower the yoke 62, which will now cause the file 60 to rise out of the throat it has been acting upon, and it will continue to rise until the roller 68 is about 80° or 90° from the depression in the cam 69. After the file 60 has cleared the throat, the spring 59 on the rod 58 forces the file forward over the succeeding tooth, and the yoke 62 through the continued turning of the eccentric 63 will force the file down into the said succeeding throat of the next tooth. By the time the file 60 reaches the bottom of said next throat, the spring 64 begins to compress again, and continues to be compressed until the roller 68 again enters the depression 63, and the cycle is repeated indefinitely.

It will thus be seen that the teeth of the saw 81 are always under the control either of the pawl 71 or of the file 60, which really acts as a stop pawl when it is cutting between the throats. It therefore follows that control of the teeth is never lost by this machine, and that the feeding of the said teeth must be regular and certain under all conditions. So regular and certain is this feeding feature, even though broken teeth are encountered, that the pawl 71 acts in the place where the throats formerly were, and the said file 60 cuts in said places so that after the broken teeth are past, the feed is taken up again with the new teeth and the same fed regularly and with certainty, as if no broken teeth had been encountered. This important feature of my invention is greatly aided by the further fact that the pawl 71 always acts in the direction of what I call the pitch line of the teeth. That is to say, if the angle between the front edge and the back edge of two adjacent teeth is bi-sected, and the bi-secting plane prolonged through the saw, the path of said plane would be the direction of the pitch line of the teeth. The lever 67 is made of such a length that the pivotal point of the member 70 carrying the pawl 71 is located upon said pitch line for the pair of teeth the said pawl engages, and therefore it follows that the pull of the pawl 71 is in the direction of this pitch line, and therefore it further follows that even if a broken tooth be encountered, the rough edges left on the saw will enable the pawl to turn the saw the proper space, precisely the same as if the tooth had not been broken. Such being the fact, the file 60 will likewise cut in the places where the throats ought to be, and thus further aid the pawl in turning the saw. It further results from the foregoing that since control of the teeth of the saw is never lost, the feed and cutting is very regular and certain, and the machine may be run at a high speed. In addition to the above, since the pawl 71 moves the saw throughout a large portion of the cycle, and since the spring 64 causes the file 60 to continuously act in the throat between the teeth when the cam 63 is not holding it there, there is practically no time lost in shifting the parts to accomplish the feed, and therefore, almost a continuous cutting is had throughout the cycle. This feed increases greatly the capacity of the machine.

Another important feature of my invention resides in the fact that owing to the cushioning action of the spring 64 it affords a relief in case the file 60 is nicked or broken or is otherwise irregular and tends to jam in the teeth. That is to say, should a broken portion of the file 60 contact with the back or flat side of the tooth, then the said file being in continuous rotation, the resolved component of its motion which would tend to throw the file away from the saw, will serve to further compress the spring 64, and allow the said file to leave the saw without inflicting an injury thereon. Further, any force tending to move the rod 58 in a longitudinal direction will also be absorbed by the spring 59, so that the said file 60 is cushioned in two directions at right angles to each other, and may therefore automatically be thrown away from the teeth of the saw whenever a tendency to jam is encountered.

Still another important feature of my invention resides in the fact that the member 77 carrying the pawl 71 is cushioned by spring action, as shown, so that as the collar 79 comes forward, it pushes the pawl by a cushioning action until the said pawl contacts with the back of a succeeding tooth whether the spacing between the teeth is regular or irregular. In other words, the feeding of the pawl forward is accomplished with perfect regularity and certainty, although the teeth may be irregularly spaced apart. In addition to the above, the collar on the flat face 100 of the file 60 affords a stop for the member 77 and prevents the pawl 71 from coming in contact with the cutting face of the file 60, and therefore prevents the said pawl from being filed out of shape, which would inevitably occur if some such means were not provided.

It will now be clear from the mechanism so far disclosed that while the files 27 and 35 are cutting opposite sides of the teeth 80, the file 60 is acting upon the throat of the teeth, and is also following the circular contour of the saw teeth in the manner just described.

In order that the entire machine may be readily brought in position to act upon a gang of gin saws, the main frames 22 are provided with a pair of projections 82 and 83, as best seen in Figs. 1, 2 and 3, and each projection is provided with an extension 84 and 85, which extensions may project over the blades 81 of the saws, and their flat sides 86 may further steady said blades, as will be clear from Figs. 1, 2 and 3. The said extensions 83 are adapted to rest upon the central hub 88 supporting the saws 81, and the whole forms a steady and firm support by which the machine may accurately operate upon the saw teeth.

In order that the files 27 and 35 may the more firmly rub against the individual teeth 80, I have provided a forked lever 90 pivoted as at 91 to the main frame, and having the springs 92, as best shown in Fig. 4. The said springs 92 are preferably provided with lugs or projections 93, which take against cams 94 and 95 carried by the main gear 3, as will be clear from Figs. 1, 2 3 and 4. Accordingly, as the cams 94 and 95 revolve, the projections 93 will be alternately struck by said cams, and the lever 90 oscillated upon its pivot 91. Since said lever is connected as at 96, to the spring 40, it will cause an additional and yielding pressure between the file 27, or 35, as the case may be, and the corresponding tooth 80 upon which it happens to be working.

The operation of my invention will be clear from the foregoing, but may be briefly summarized as follows:—Power being applied to the shaft 2, motion will be imparted through the gear 3, pinion 4, the shaft 5, the wheels 6 and 30, to the pitmen 8 and 31, to the pins 11 and 33 to the reciprocating rods 16 and 34, and to the crossed files 27 and 35 acting on opposite sides of the individual saw teeth 80 of the saws 81. Simultaneously with this action, the cam 69 will oscillate the lever 67 and will in turn reciprocate the pawl 71, which will turn the saw teeth 80, while the saws are still acting upon opposite sides thereof, and thereby will cause the said teeth to assume the well known hawk-bill or tapered shape in two dimensions, which is so desirable for gin saws. In other words, it is evident that if the saws 35 and 27 acted upon the teeth 80, while the said teeth are stationary, they could not be tapered in two directions at right angles to each other, as is the case when the said files begin at the base of said teeth and the said teeth are drawn through the files until they finish acting on the teeth at their extreme points. This is an important feature of my invention, and it is new with me, so far as I am aware. In addition to the above, the cam 63, through the lever 61 and connections, will oscillate the disk file 60 to gum the saw, or to cut out the throats between the teeth, and since this cutting action only lasts for a brief interval of time after which the pawl 71 rotates said teeth while the file 60 is still acting thereupon, it is evident that the circular portion 105 (Fig. 8) of said teeth will be acted upon by the said file 60, and the correct contour of the teeth therefore preserved. This is another important feature of my invention, and is new with me, so far as I am aware.

It results from the two actions just described, which are caused by the movement of the teeth 80 past the files 27 and 35 and past the circular file 60, that I am enabled not only to preserve the very desirable hawk-bill shape to the teeth of gin saws, but I am even enabled by this machine to give this shape to gin saws which have been damaged by improper filing. In other words, my machine sharpens and gums gin saws in every respect equal to hand labor.

It is obvious that those skilled in the art may vary the details of construction as well as the arrangement of parts without departing from the spirit of my invention, and therefore, I do not wish to be limited to the above disclosure, except as may be required by the claims.

What I claim is:—

1. In a saw sharpening device, the combination of a pair of crossed files adapted to cut opposite sides of teeth on the same saw; reciprocating holders for said files; a power shaft; pivoted supports for said holders; connections between said holders and said power shaft for reciprocating said holders and files; a pawl for moving said teeth in a circular path while said files are acting upon the same; and connections comprising a lever and cam between said pawl and said power shaft adapted to cause said pawl to suddenly engage a new tooth to exert a force in the direction of the pitch line of said tooth, and to gradually feed said first mentioned teeth past said files, substantially as described.

2. In a saw sharpening device, the combination of a pair of crossed files adapted to cut opposite sides of teeth on the same saw; reciprocating holders for said files; a power shaft; pivoted supports for said holders; connections between said holders and said power shaft for reciprocating said holders and files; a pawl engaging a throat between two teeth for moving said first mentioned teeth in a circular path while said files are acting upon the same; and connections comprising a lever and a cam between said pawl and said shaft, said pawl being pivoted to said lever and adapted to exert a pull on said saw in a direction of the pitch line between said second mentioned teeth, substantially as described.

3. In a saw sharpening device, the combination of a pair of crossed files adapted to act upon the opposite side of teeth on the same saw; a circular file adapted to act upon a throat between two teeth of the said saw while said crossed files are operating; and a pawl adapted to pull in the direction of the pitch line between two teeth to move the said first mentioned teeth in a circular path while said crossed files and circular file are operating thereon, substantially as described.

4. In a saw sharpening device, the combination of a pair of crossed files adapted to act upon the opposite sides of teeth on the same saw; a power shaft; connections comprising reciprocating members between said shaft and said files; a circular file adapted to act upon a throat between two teeth of said saw while said crossed files are operating; connections comprising a shaft and gears between said circular file and said power shaft; and a pawl adapted to pull on said saw in the direction of the pitch line between two teeth and provided with connections to said power shaft adapted to move all of said teeth in a circular path while said crossed files and circular file are operating thereon, substantially as described.

5. In a saw sharpening device, the combination of a pair of reciprocating members carrying files adapted to act on opposite sides of the teeth of a saw; a spring for pressing said files against said teeth; a circular file adapted to cut between a pair of teeth of the said saw simultaneously with the operation of said first mentioned files; means for cushioning the action of said circular file in two directions at right angles to each other; a pawl adapted to turn said teeth in a circular path while all of said files are acting thereon; and means for actuating said files and pawl, substantially as described.

6. In a saw sharpening device, the combination of a pair of reciprocating members carrying files adapted to act on opposite sides of the teeth of a saw; a spring for pressing said files against said teeth; a circular file adapted to cut between a pair of teeth of the said saw simultaneously with the operation of said first mentioned files; a pawl adapted to turn said teeth in a circular path while all of said files are acting thereon; and means for simultaneously actuating said files and pawl comprising a cushioning device for said circular file, a power shaft, cams on said shaft, a gear on said shaft, a second shaft and a pinion and wheels on said second shaft, substantially as described.

7. In a saw sharpening device, the combination of a pair of reciprocating members carrying files adapted to act on opposite sides of the teeth of a saw; a spring for pressing said files against said teeth; oscillating means for increasing the effect of said spring on said files; a circular file adapted to cut between a pair of teeth of said saw simultaneously with the operation of said first mentioned files; a cushioning means for said circular file; a pawl adapted to turn said teeth in a circular path while all of said files are acting thereon; and means for actuating said files and pawl, substantially as described.

8. In a saw sharpening device, the combination of a pair of reciprocating members carrying files adapted to act on opposite sides of the teeth of a saw; a spring for pressing said files against said teeth; a lever connected to said spring; cam means for oscillating said lever to alternately increase the effect of said spring on said files; a circular file adapted to cut between a pair of teeth simultaneously with the operation of said first mentioned files; a pawl adapted to turn said teeth in a circular path while all of said files are acting thereon; and means for actuating said files and pawl, substantially as described.

9. In a saw sharpening device, the combination of a pair of crossed files to act upon opposite sides of the teeth of a saw; a disk file to simultaneously cut between a pair of teeth of said saw; a cushioning means for said disk file; a pawl to turn said teeth while said files are operating; means comprising a spring controlling the feed of said pawl; a common means for actuating said files and pawl; and a frame provided with extensions for steadying and holding said parts to their work, substantially as described.

10. In a saw sharpening device, the combination of a pair of crossed files to act upon opposite sides of the teeth of a saw; a disk file to simultaneously cut between a pair of teeth of said saw; a cushioning means for said disk file; a pawl to turn said teeth while said files are operating; means comprising a spring to control the feed of said pawl; a common means for actuating said files and pawl; and a frame provided with angular extensions passing over the teeth to be operated upon and resting against the sides of the saws for steadying and holding said parts to their work, substantially as described.

11. In a saw sharpening device, the combination of means for filing opposite sides of the teeth of a saw; a circular file adapted to cut between a pair of teeth of the same saw; a reciprocating shaft carrying said circular file; a slotted spring member through which said shaft passes; a feed pawl carried by said slotted member; an eccentric for actuating said circular file; a spring connection associated with said eccentric adapted to cushion the action of said circular file and to be compressed by said eccentric; a cam for actuating said feed pawl; and common means for actuating said eccentric and cam, substantially as described.

12. In a saw sharpening device, the combination of a pair of crossed files adapted to act upon the opposite sides of teeth on the same saw; a circular file adapted to act upon a throat between two teeth of the said saw while said crossed files are operating; a pawl adapted to pull in the direction of the pitch line between two teeth to move the said first mentioned teeth in a circular path while said crossed files and circular file are operating thereon; and a support pivotally attached to the frame of the machine, substantially as described.

In testimony whereof, I affix my signature, in presence of two witnesses.

JOHN R. SMITH.

Witnesses:
PAUL TURNER,
J. A. FOUCHE.